(12) United States Patent
Salvatierra Macua

(10) Patent No.: US 11,454,220 B2
(45) Date of Patent: Sep. 27, 2022

(54) BEARING ARRANGEMENT FOR A WIND TURBINE AND WIND TURBINE

(71) Applicant: Siemens Gamesa Renewable Energy Innovation & Technology S.L., Sarriguren (ES)

(72) Inventor: Carlos Jesus Salvatierra Macua, Beriain (ES)

(73) Assignee: SIEMENS GAMESA RENEWABLE ENERGY INNOVATION & TECHNOLOGY S.L.

( * ) Notice: Subject to any disclaimer, the term of this patent is extended or adjusted under 35 U.S.C. 154(b) by 290 days.

(21) Appl. No.: 16/748,983

(22) Filed: Jan. 22, 2020

(65) Prior Publication Data
US 2020/0240396 A1    Jul. 30, 2020

(30) Foreign Application Priority Data
Jan. 30, 2019   (EP) ..................................... 19380001

(51) Int. Cl.
*F03D 80/70* (2016.01)
*H02K 7/18* (2006.01)

(52) U.S. Cl.
CPC ........... *F03D 80/70* (2016.05); *H02K 7/1838* (2013.01); *F05B 2240/14* (2013.01);
(Continued)

(58) Field of Classification Search
CPC .......... F03D 80/70; F03D 80/80; F03D 80/88; F05B 2240/14
See application file for complete search history.

(56) References Cited

U.S. PATENT DOCUMENTS

| | | | |
|---|---|---|---|
| 8,434,996 B2 * | 5/2013 | Bagepalli | F16C 41/00 415/14 |
| 8,779,619 B2 * | 7/2014 | Liingaard | F03D 80/70 290/55 |

(Continued)

FOREIGN PATENT DOCUMENTS

| | | |
|---|---|---|
| CN | 201714598 U | 1/2011 |
| CN | 201821009 U | 5/2011 |

(Continued)

OTHER PUBLICATIONS

European Search Report dated Jul. 4, 2019 for Application No. 19380001.8.

*Primary Examiner* — Christopher R Legendre
(74) *Attorney, Agent, or Firm* — Schmeiser, Olsen & Watts LLP

(57) ABSTRACT

A bearing arrangement for a wind turbine includes a bed frame, a shaft configured for connecting a rotor with a generator of the wind turbine, a front bearing and a rear bearing both supporting the shaft rotatably around a shaft axis, a front bearing housing supporting the front bearing, the front bearing housing including one or more feet connected to the bed frame, a rear bearing housing supporting the rear bearing, the rear bearing housing including one or more feet connected to the bed frame, and a stiffening element connecting one of the feet of the front bearing housing and one of the feet of the rear bearing housing. Having the stiffening element allows a reinforcement of the connection between the front bearing housing, the rear bearing housing and the bed frame. The stiffening element reduces the deformation of the bearing housings and the bed frame.

12 Claims, 6 Drawing Sheets

(52) U.S. Cl.
CPC ..... *F05B 2240/50* (2013.01); *F05B 2270/331* (2013.01); *F16C 2300/14* (2013.01); *F16C 2360/31* (2013.01)

(56) References Cited

U.S. PATENT DOCUMENTS

| | | | |
|---|---|---|---|
| 9,771,924 B2* | 9/2017 | Demtroder | F03D 80/70 |
| 10,677,223 B2* | 6/2020 | Rock, Jr. | B22F 10/10 |
| 2011/0243754 A1 | 10/2011 | Luneau et al. | |
| 2012/0134810 A1 | 5/2012 | Bagepalli et al. | |
| 2012/0134811 A1 | 5/2012 | Bagepalli et al. | |
| 2019/0136837 A1* | 5/2019 | Christiansen | F03D 13/10 |
| 2020/0240396 A1* | 7/2020 | Salvatierra Macua | H02K 7/1838 |

FOREIGN PATENT DOCUMENTS

| | | |
|---|---|---|
| CN | 102407937 A | 4/2012 |
| CN | 102628478 A | 8/2012 |
| CN | 102648347 A | 8/2012 |
| CN | 103518062 A | 1/2014 |
| CN | 203645430 U | 6/2014 |
| CN | 203730576 U | 7/2014 |
| CN | 205383043 U | 7/2016 |
| CN | 106523304 A | 3/2017 |
| CN | 107269721 A | 10/2017 |
| CN | 207500065 U | 6/2018 |
| CN | 207634253 U | 7/2018 |
| DE | 202012011274 U1 | 2/2014 |
| EP | 2433781 A2 | 3/2012 |
| EP | 2484902 A2 | 8/2012 |
| EP | 2494196 A2 | 9/2012 |
| EP | 2683940 A2 | 1/2014 |
| EP | 2754893 A1 | 7/2014 |
| EP | 3141747 A1 | 3/2017 |
| KR | 20140003125 U | 5/2014 |
| WO | WO 2011/051369 | 5/2011 |
| WO | WO 2011051369 A2 | 5/2011 |
| WO | WO 2012/119603 | 9/2012 |

\* cited by examiner

BEARING ARRANGEMENT FOR A WIND TURBINE AND WIND TURBINE

CROSS-REFERENCE TO RELATED APPLICATIONS

This application claims priority to European Application No. 19380001.8, having a filing date of Jan. 30, 2019, the entire contents of which are hereby incorporated by reference.

FIELD OF TECHNOLOGY

The following relates to a bearing arrangement for a wind turbine and a wind turbine.

BACKGROUND

In wind turbines, bearings are used to support the main shaft connecting the rotor to the gear box and/or the generator. The main shaft is subjected to substantial loads from the rotor blades during the operation of the wind turbine. To better absorb non-torque loads from the rotor blades, bearing arrangements of wind turbines often comprise two main bearings supporting the main shaft. Yet, it has been found that conventional bearing arrangements comprising, for example, two separate bearing housings fastened to the bed frame, do not sufficiently absorb non-torque loads in strong wind conditions.

SUMMARY

An aspect relates to an improved bearing arrangement for a wind turbine and an improved wind turbine.

Accordingly, a bearing arrangement for a wind turbine is provided. The bearing arrangement comprises a bed frame and a shaft configured for connecting a rotor with a generator of the wind turbine. The bearing arrangement comprises a front bearing and a rear bearing both supporting the shaft rotatably around a shaft axis. Further, the bearing arrangement comprises a front bearing housing supporting the front bearing. The front bearing housing comprises one or more feet connected to the bed frame. Further, the bearing arrangement comprises a rear bearing housing supporting the rear bearing. The rear bearing housing comprises one or more feet connected to the bed frame. Furthermore, the bearing arrangement comprises a stiffening element connecting one of the feet of the front bearing housing and one of the feet of the rear bearing housing.

Having the stiffening element allows a reinforcement (stiffening) of the connection between the front bearing housing, the rear bearing housing and the bed frame. In particular, the stiffening element reduces the deformation of the bearing housings and the bed frame. Further, due to the stiffening element a separation and/or sliding of contact surfaces of the bearing housings and the bed frame can be better avoided.

Thus, the bearing arrangement better transfers non-torque loads (rotor bending loads) to the bed frame. Hence, fewer bending moments are transmitted from the rotor to the gearbox and/or the generator. With reduced non-torque loads entering the gearbox and/or the generator, damage of the gearbox, the generator and/or the wind turbine is avoided. Further, a conventional bed frame and bearing housings configured for moderate mean wind velocities (e.g., class IIA conditions of mean wind velocities of 8.5 m/s) can be used under mean wind velocities of 10 m/s (class IA) or more by applying the stiffening element.

The bearing arrangement is part of a wind turbine. A wind turbine is an apparatus to convert the wind's kinetic energy into electrical energy. The wind turbine comprises a rotor having one or more blades and a nacelle comprising the bearing arrangement, the gear box and the generator. The wind turbine further comprises a tower holding, at its top end, the nacelle. The tower of the wind turbine may be connected via a transition piece to a foundation of the wind turbine, such as a monopile in the seabed.

The front bearing housing, the rear bearing housing and further components of the nacelle, such as the gear box and the generator, are each mounted to the bed frame. The bed frame is, for example, a floor of the nacelle or a portion of the floor of the nacelle. The bed frame is connected to the tower of the wind turbine to transmit loads received, for example from the bearing housings, to the tower. The bed frame may be connected to the tower of the wind turbine by means of a yaw bearing to orient the rotor into the wind.

The shaft is, for example, configured to directly connect the rotor with the generator. Alternatively, the shaft is configured to connect the rotor with the generator by directly connecting the rotor with a coupling of the gear box and by connecting the gear box with the generator by means of a further shaft.

The front bearing and the rear bearing are, in particular, two main bearings both supporting the main shaft outside the gear box/gear box housing of the wind turbine. The front bearing is, in particular, arranged closer to the rotor than the rear bearing. The front bearing is, for example, carrying radial loads only. The rear bearing is, for example, carrying both axial and radial loads.

The gear box and/or the gear box housing may be supported by two torque arms that are connected to the bed frame. Such an arrangement is referred to as a four-point wind turbine drivetrain configuration, as the front bearing, the rear bearing and the two torque arms form four points of support of the main shaft. A four-point wind turbine drivetrain configuration is advantageous over a three-point wind turbine drivetrain configuration comprising only one main bearing because non-torque loads from the rotor blades can be better transmitted to the bed frame.

The bearing arrangement comprises the stiffening element connecting one of the feet of the front bearing housing and one of the feet of the rear bearing housing, and, in particular, connecting both feet to the bed frame.

The front bearing housing comprises, for example, a left foot and a right foot with respect to the shaft axis when seen from above. Both the left foot and the right foot of front bearing housing are connected, e.g., bolted, to the bed frame.

Further, also the rear bearing housing comprises, for example, a left foot and a right foot. Both the left foot and the right foot of the rear bearing housing are connected, e.g., bolted, to the bed frame.

The stiffening element is, for example, connecting the right foot of the front bearing housing to the right foot of the rear bearing housing and both to the bed frame. The stiffening element is, for example, connecting the left foot of the front bearing housing to the left foot of the rear bearing housing and both to the bed frame.

In embodiments, the bearing arrangement comprises two stiffening elements, one connecting the right feet of the two bearing housings and one connecting the left feet of the two bearing housings. Further, the right feet and the left feet are, in particular, connected to the bed frame.

The stiffening element is, for example, a solid, one-piece element (i.e. made from one continuous piece of material).

According to an embodiment, the stiffening element extends, exclusively, in one plane, the plane of the stiffening element being a horizontal plane and/or a plane inclined to the horizontal plane by an angle by which the shaft axis is inclined to the horizontal plane and/or a plane between the horizontal plane and the inclined plane.

The stiffening element extending, exclusively, in one plane means that an extension of the stiffening element perpendicular to its extension plane is small in comparison with the extension of the stiffening element in the extension plane. For example, the extension of the stiffening element perpendicular to the extension plane of the stiffening element is smaller than 30%, smaller than 20%, smaller than 15% and/or smaller than 10% of the extension of the stiffening element in the extension plane.

The stiffening element extending, exclusively, in one plane means, in particular, that the stiffening element has no portion protruding out of the extension plane, e.g., upwards from the extension plane. I.e., the stiffening element is not crossing the shaft axis.

The horizontal plane is, in particular, a horizontal plane of the wind turbine. The shaft axis may be oriented horizontally or may be inclined with respect to the horizontal plane by an inclination angle. For example, the inclination angle of the shaft axis from the horizontal plane may be between 0 and 20°.

By having the stiffening element extending, exclusively, in one plane, the reinforcement of the connection between the front bearing housing, the rear bearing housing and the bed frame can be achieved with a simple configuration of the stiffening element.

According to a further embodiment, the stiffening element extends, exclusively, in one direction and comprises a cross-section varying along its extension direction.

The stiffening element has, in particular, an elongated shape. The extension direction of the stiffening element is, in particular, a straight connecting line between the one foot of the front bearing housing and the one foot of the rear bearing housing.

By having the stiffening element extending, exclusively, in one direction, the stiffening element has simple and light weight configuration. In particular, manufacturing, transporting and assembling of the stiffening element is cost and time efficient.

According to a further embodiment, the stiffening element comprises a front portion and a rear portion. The stiffening element is connected at its front portion to the one foot of the front bearing housing and is connected at its rear portion to the one foot of the rear bearing housing.

Both the front portion and the rear portion of the stiffening element comprise, in particular, holes and/or through holes for connection with the bearing housings and, in particular, with the bed frame.

According to a further embodiment, the cross-section of the stiffening element varies along its extension direction such that an area of the cross-section at a middle portion of the stiffening element is smaller than an area of the cross-section at the front portion of the stiffening element and an area of the cross-section at the rear portion of the stiffening element.

The middle portion is, in particular, arranged between the front portion and the rear portion. The middle portion is, in particular, continuous with the front portion and the rear portion.

By having the front portion and the rear portion with the larger cross-section, the stiffening element can be stably connected at the front portion and the rear portion to the bearing housings. By having the middle portion with the smaller cross-section, the stiffening element can be configured even lighter.

According to a further embodiment, a width of the cross-section of the stiffening element at the middle portion is smaller than a width of the cross-section at the front portion and a width of the cross-section at the rear portion.

By having the front portion and the rear portion with the larger width of the cross-section, the stiffening element can be more stably connected at the front portion and the rear portion to the feet of the bearing housings.

In embodiments, the middle portion may comprise a recess in a width direction of the stiffening element. The recess may be curved having a radius in the direction towards the shaft axis.

According to a further embodiment, a height of the cross-section of the stiffening element at the middle portion is equal or larger than a height of the cross-section at the front portion and a height of the cross-section at the rear portion.

According to a further embodiment, the stiffening element is arranged, exclusively, laterally with respect to the shaft axis when seen from above.

The stiffening element is, in particular, not crossing above and/or below the shaft axis when seen from above, i.e. when seen from above with respect to the wind turbine.

By having the stiffening element arranged, exclusively, laterally with respect to the shaft axis when seen from above, the stiffening element can be easier assembled with the bearing housings and the bed frame. Further, an access to the shaft, e.g., for maintenance work, is possible without removing the stiffening element.

According to a further embodiment, the bearing arrangement comprises first fastening means fastening the stiffening element to the one foot of the front bearing housing and to the bed frame and/or comprises second fastening means fastening the stiffening element to the one foot of the rear bearing housing and the bed frame.

By fastening the stiffening element to the one foot of the front bearing housing and to the bed frame with the same first fastening means, a direct connection of the stiffening element, the front bearing housing and the bed frame is provided. Likewise, by fastening the stiffening element to the one foot of the rear bearing housing and to the bed frame with the same second fastening means, a direct connection of the stiffening element, the rear bearing housing and the bed frame is provided. Thus, a better reinforcement of the bearing housings and the bed frame can be achieved.

The stiffening element comprises, in particular, through holes for connection with the bearing housings and the bed frame. For example, both the front portion and the rear portion of the stiffening element comprises the through holes. Further, also the one or more feet of the bearing housings comprise through holes for connection with the stiffening element and the bed frame. The through holes of the stiffening element and the feet may be unthreaded or may be threaded.

According to a further embodiment, the first fastener or first fastening means and/or the second fastener or fastening means comprise bolts.

Alternatively, the first fastener or first fastening means and/or the second fastener or second fastening means comprise screws.

According to a further embodiment, the bearing arrangement comprises a cover structure covering the shaft while being spaced apart from the shaft. The cover structure is connected to the front bearing housing, the rear bearing housing and/or the stiffening element.

By having the cover structure, the shaft can be protected and/or workers can be protected from the shaft rotating during operation. In particular, the cover structure may cover the shaft completely from above such that it bridges the shaft and that workers can walk across the shaft from a left side of the shaft to a right side of the shaft or vice versa.

According to a further embodiment, the front bearing and/or the rear bearing is a spherical roller bearing.

For example, the front bearing and/or the rear bearing is a spherical roller bearing comprising two rows of spherical rollers. Alternatively, the front bearing and/or the rear bearing is a tapered roller bearing or another roller element bearing.

According to a further embodiment, the stiffening element is made from cast iron.

Thereby, the stiffening element is cheap to manufacture.

In embodiments, the stiffening element is made from one piece, i.e. it is formed integrally.

Thus, the stiffening element is easy to manufacture and to configure stiff.

According to a further aspect, a wind turbine comprising the bearing arrangement as described above is provided.

According to a further embodiment of the further aspect, the wind turbine comprises a rotor and a generator. The shaft of the bearing arrangement connects the rotor with the generator.

This includes arrangements where the shaft is coupled using a coupling, for example a shrink disc coupling, to a gearbox. The gearbox in turn may be connected to the generator by another coupling. Hence, the shaft may be connected to the generator directly or indirectly.

Further possible implementations or alternative solutions of embodiments of the invention also encompass combinations—that are not explicitly mentioned herein—of features described above or below with regard to the embodiments. The person skilled in the art may also add individual or isolated aspects and features to the most basic form of embodiments of the invention.

BRIEF DESCRIPTION

Some of the embodiments will be described in detail, with reference to the following figures, wherein like designations denote like members, wherein.

DETAILED DESCRIPTION

Figure 1:
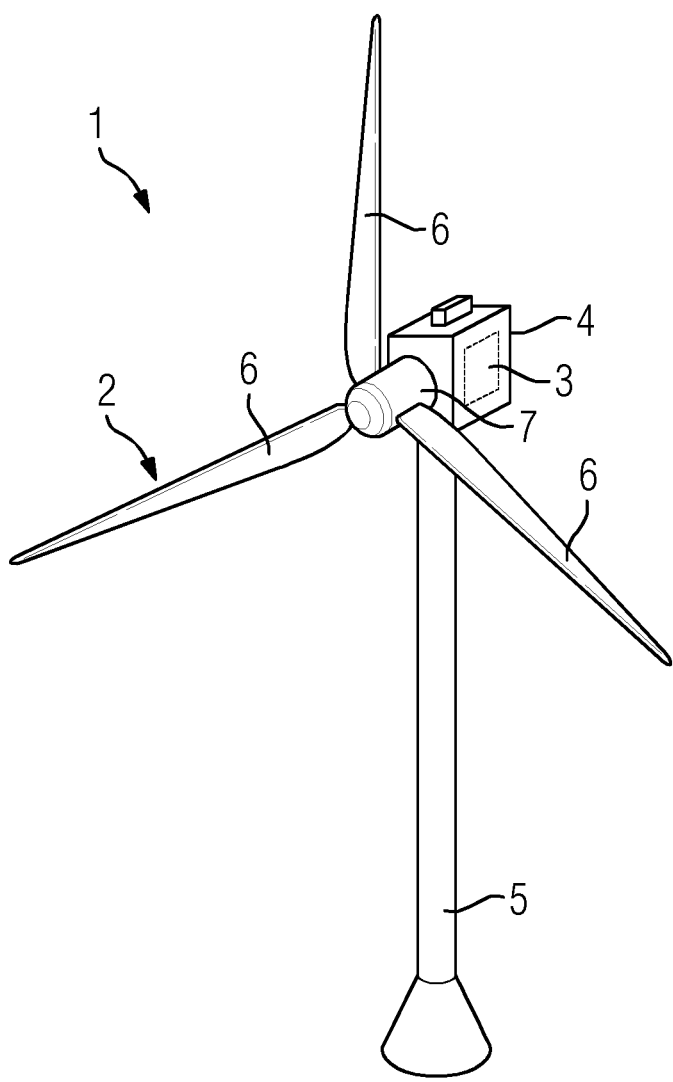
FIG. 1 shows a perspective view of a wind turbine according to an embodiment.

FIG. 1 shows a wind turbine 1 according to an embodiment.

The wind turbine 1 comprises a rotor 2 connected to a generator 3 arranged inside a nacelle 4. The nacelle 4 is arranged at the upper end of a tower 5 of the wind turbine 1.

The rotor 2 comprises, for example, three rotor blades 6. The rotor blades 6 are connected to a hub 7 of the wind turbine 1. Rotors 2 of this kind may have diameters ranging from, for example, 50 to 160 meters or even more. The rotor blades 6 are subjected to high wind loads. Accordingly, high loads act on a main shaft (not shown in FIG. 1) connecting the hub 7 to the generator 3.

Figure 2:
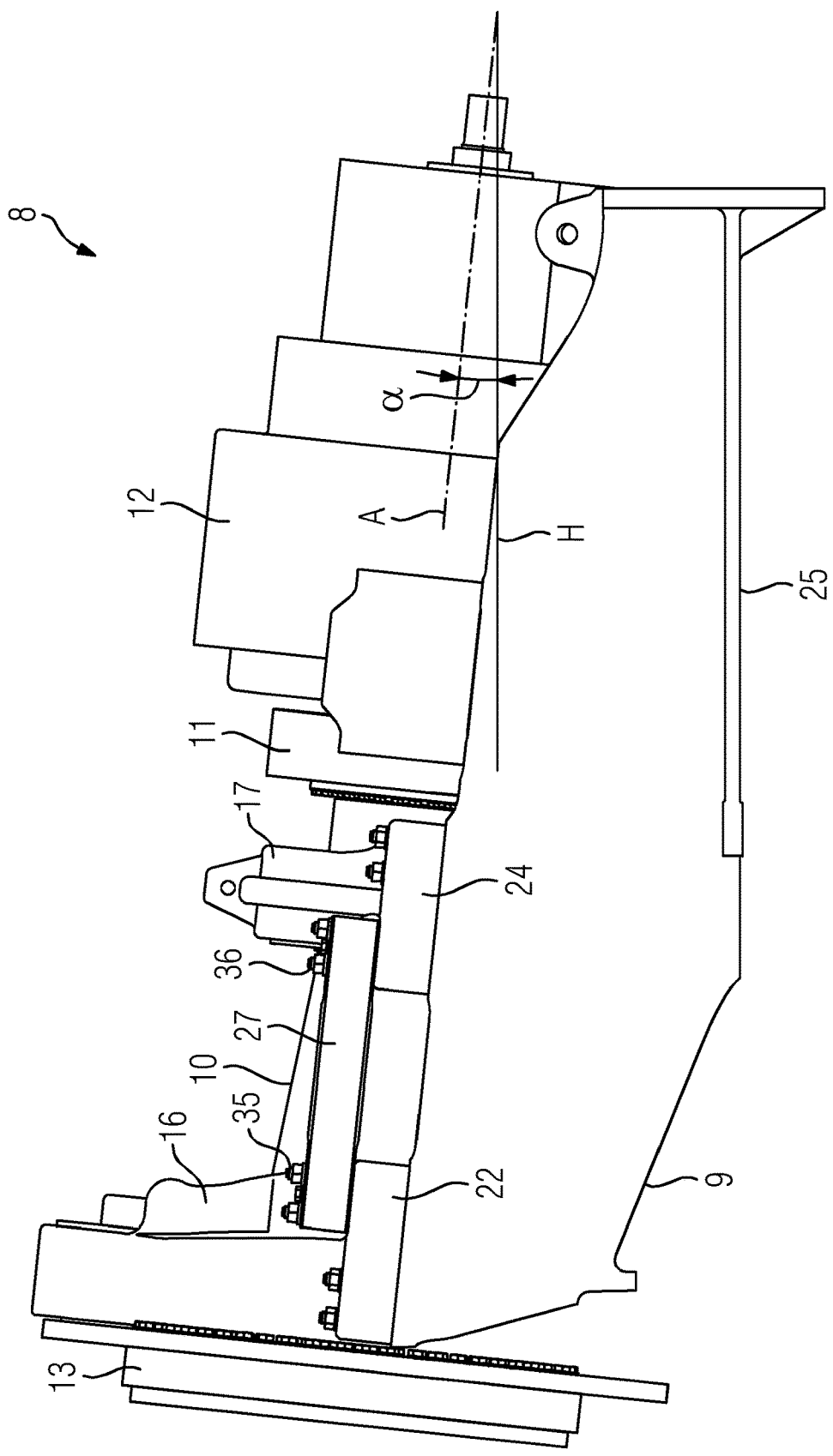
FIG. 2 shows a side view of a bearing arrangement of the wind turbine of FIG. 1.
Figure 3:
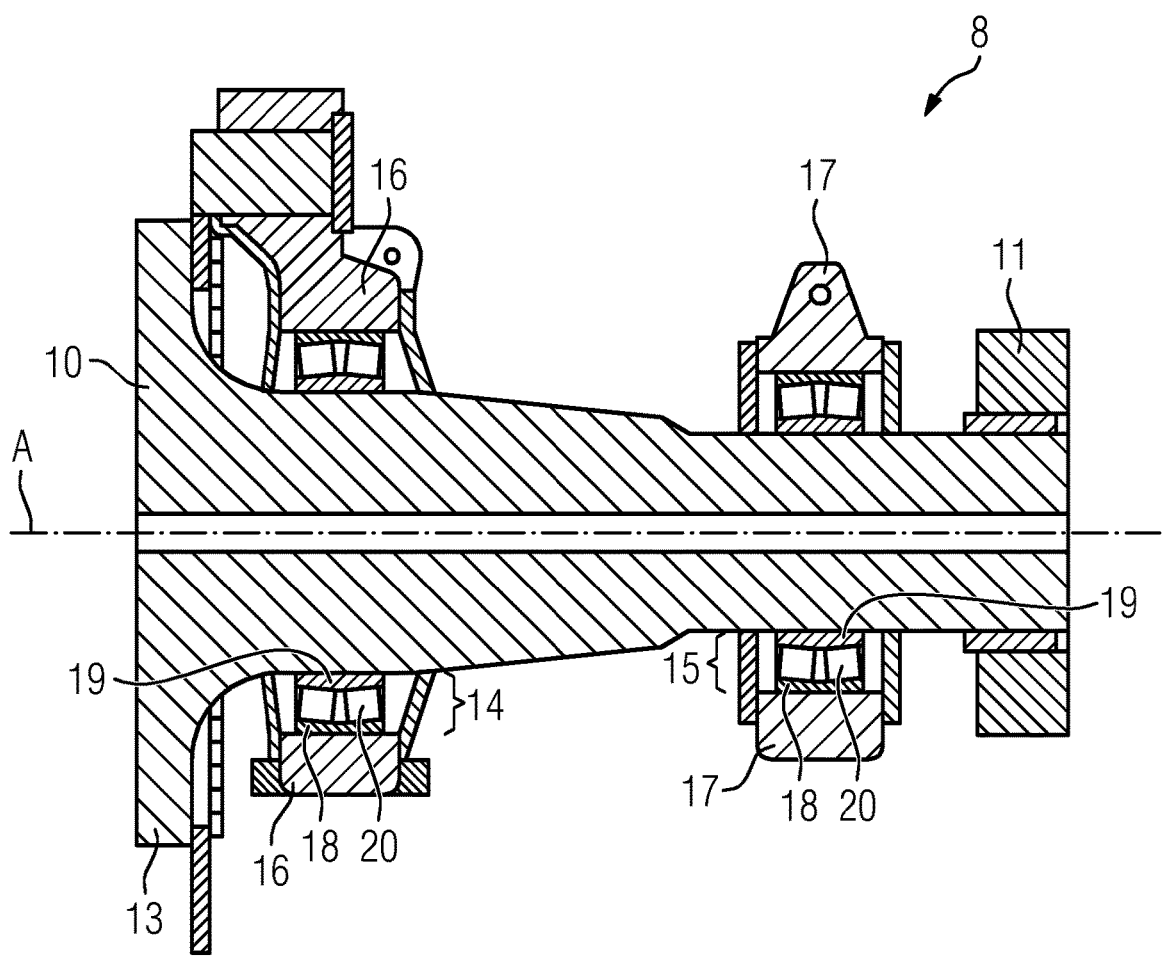
FIG. 3 shows a cross-section taken from the bearing arrangement of FIG. 2 along a shaft axis of the main shaft.
Figure 4:
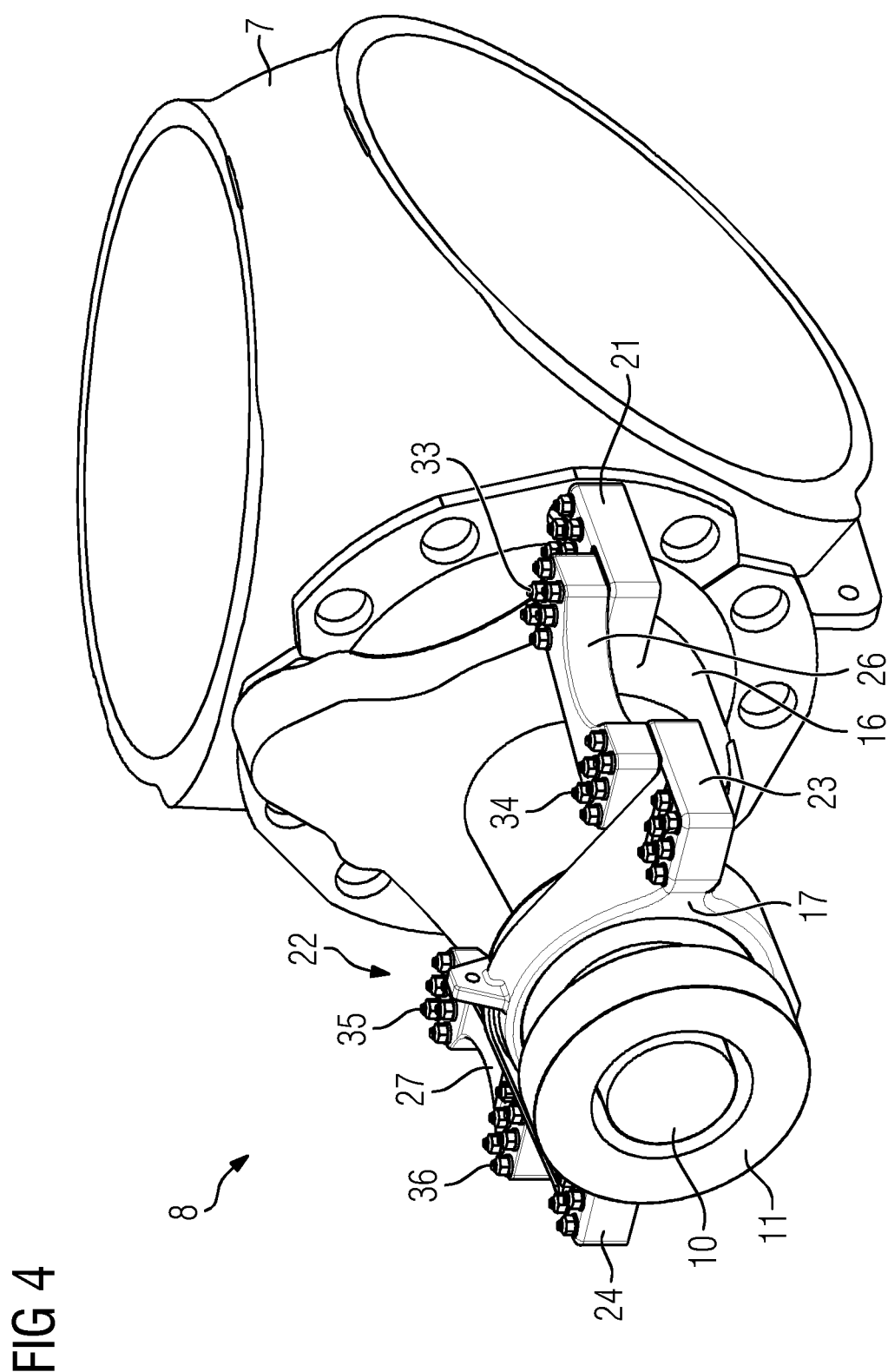
FIG. 4 shows a perspective view of the bearing arrangement of FIG. 2.

FIG. 2 shows a bearing arrangement 8 as used in the wind turbine 1 of FIG. 1. The bearing arrangement 8 is shown in a side view in FIG. 2. FIG. 3 illustrates a cross-section of the bearing arrangement 8, and FIG. 4 illustrates a perspective view of the bearing arrangement 8. A bed frame 9 of the bearing arrangement 8 is only shown in FIG. 2 but omitted in FIGS. 3 and 4.

The bearing arrangement 8 comprises a main shaft 10. The main shaft 10 connects the hub 7 to a coupling 11 (FIGS. 3 and 4). The coupling 11 may be a shrink disc coupling. The coupling 11 connects the main shaft 10 to a gearbox 12 (FIG. 2). The gearbox 12 is connected to the generator 3 (FIG. 1). A shaft axis of the main shaft 10 is denoted by reference numeral A.

The main shaft 10 may be configured as a hollow shaft (FIG. 3) and may comprise a flange 13 for connecting to the hub 7.

As shown in FIG. 3, the bearing arrangement 8 comprises two main bearings 14, 15 supporting the main shaft 10 rotatably. The front bearing 14 is arranged close to the hub 7. The rear bearing 15 is arranged close to the coupling 11 and the gear box 12. In particular, both bearings 14, 15 are located outside the gear box 12 and upwind of the gear box 12. There may be some additional bearings (not shown) integrated into the gear box. The gear box 12 and/or the gear box housing may be supported by two torque arms (not shown in detail) that are connected to the bed frame.

The bearings 14, 15 may be formed as gliding bearings or roller element bearings, in particular spherical bearings. For example, the front bearing 14, may be configured to carry radial loads only transmitted from the rotor blades, whereas the rear bearing 15, may be configured to carry both axial and radial loads.

As can be seen in FIGS. 2 to 4, the bearing arrangement 8 further comprises bearing housings 16, 17. In particular, a front bearing housing 16 houses the front bearing 14, and a rear bearing housing 17 houses the rear bearing 15.

Each of the bearing housings 16, 17 supports a respective outer race 18 of the bearings 14, 15 (FIG. 3). A respective inner race 19 is fixed to the main shaft 10. Roller elements between the outer and inner race 18, 19 are denoted by reference numeral 20 in FIG. 3.

The bearing housings 16, 17 are bolted to the bed frame 9 to transmit loads, in particular non-torsional loads, from the shaft 10 to the bed frame 9.

In particular, as shown in FIG. 4, each of the bearing housings 16, 17 comprises two feet 21, 22, 23, 24. Each of the feet 21, 22, 23, 24 is connected to the bed frame 9 (FIG. 2). In particular, the front bearing housing 16 comprises a right foot 21 and a left foot 22 each bolted to the bed frame 9. Further, the rear bearing housing 17 comprises a right foot 23 and a left foot 24 each bolted to the bed frame 9.

The bed frame 9 of the bearing arrangement 8 is connected at a lower part 25 thereof (FIG. 2) to a yaw bearing (not shown) which in turn is connected to the tower 5 (FIG.

1). By having the yaw bearing, the bed frame 9 is able to yaw around a yaw axis which substantially corresponds to the vertical axis of the tower 5.

Ideally, all non-torsional loads from the shaft 10 are transmitted to the bed plate 9 via the respective four feet 21, 22, 23, 24 of the bearing housings 16, 17. However, very strong winds may still cause bending moments of the bearing housings 16, 17 relative to each other and of the bed plate 9. When such non-torque loads enter the gear box 12, they can, for example, damage the gear box 12.

In order to stiffen the connection of the bearing housings 16, 17 to the bed plate 9, the bearing arrangement 8 comprises two stiffening elements 26, 27. As shown in FIG. 4, the bearing arrangement 8 comprises a right stiffening element 26 arranged laterally on a right side of the shaft 10 when seen from above the wind turbine 1. Further, the bearing arrangement 8 comprises a left stiffening element 27 arranged laterally on a left side of the shaft 10. The stiffening elements 26, 27 are solid, one-piece elements.

Figure 5:
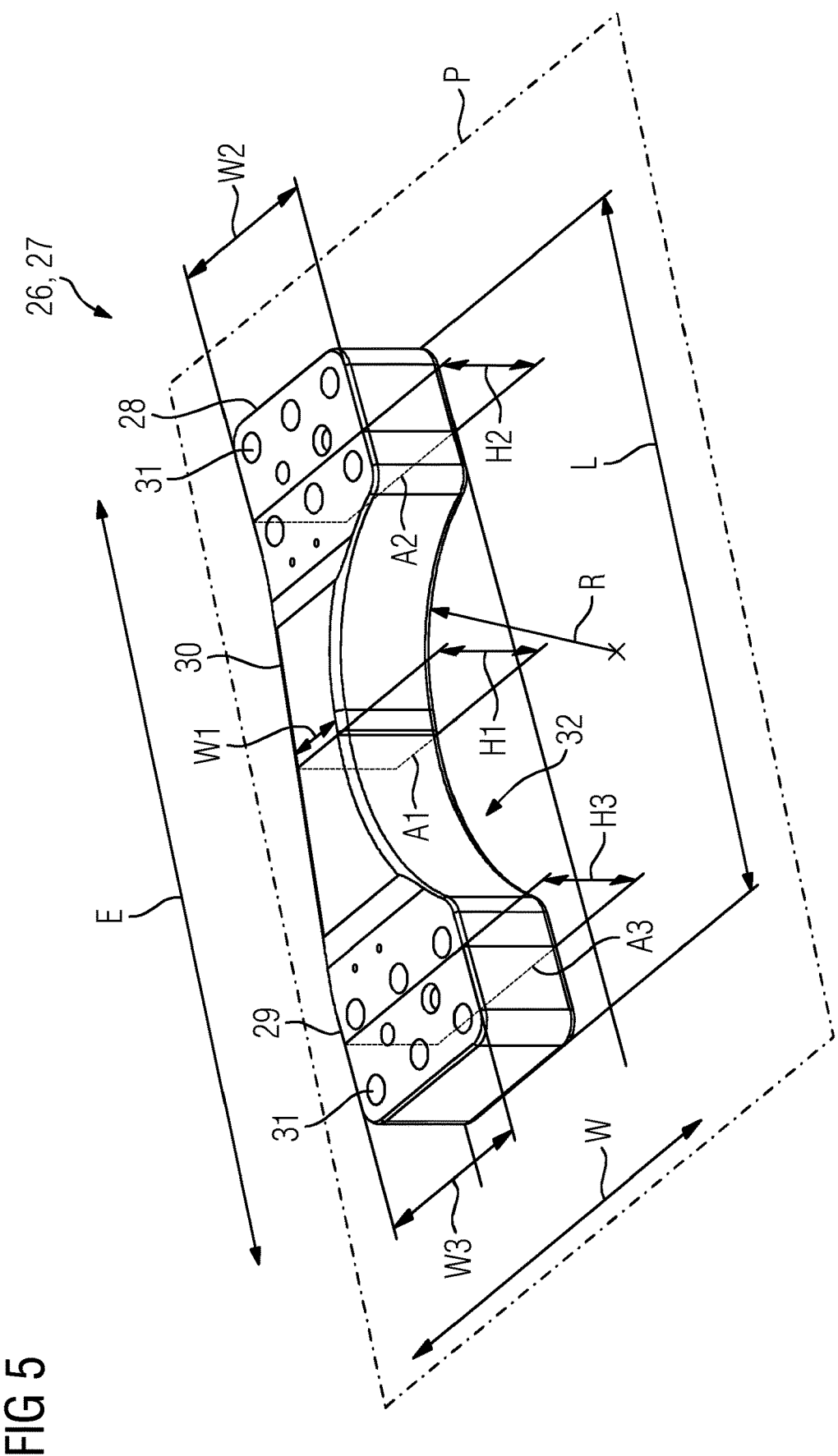
FIG. 5 shows, in a perspective view, a stiffening element of the bearing arrangement of FIG. 2.

FIG. 5 shows a detailed view of one of the stiffening elements 26, 27, for example, the right stiffening element 26 of FIG. 4. The stiffening element 26 extends, exclusively, in one direction E. A cross-section of the stiffening element 26 varies along the extension direction E in terms of an area A1, A2, A3 and a width W1, W2, W3 of the cross-section. A height H1, H2, H3 of the stiffening element 26 is constant along the extension direction E in this example. W denotes a width direction of the stiffening element 26. The stiffening element 26 extends, exclusively, in a plane P defined by the extension direction E and the width direction W. That means, the height H1, H2, H3 of the stiffening element 26 is much smaller than a length L of the stiffening element 26 in the extension direction E.

The shaft axis A of the main shaft 10 is, for example, inclined by an angle α (FIG. 2) with respect to the horizontal plane H of the wind turbine 1. As FIG. 2 shows a side view of the bearing arrangement 8 of the wind turbine 1, the horizontal plane H is shown as a line H in FIG. 2.

The stiffening element 26 comprises a front portion 28, a rear portion 29 and between the front and rear portions 28, 29 a middle portion 30. Both the front and rear portions 28, 29 comprise several through holes 31 for connection with the bearing housings 16, 17.

The cross-section of the stiffening element 26 varies along its extension direction E such that an area A1 of the cross-section at the middle portion 30 is smaller than an area A2 of the cross-section at the front portion 28 and an area A3 of the cross-section at the rear portion 29.

Further, the cross-section of the stiffening element 26 varies along its extension direction E such that a width W1 of the cross-section at the middle portion 30 is smaller than a width W2 of the cross-section at the front portion 28 and a width W3 of the cross-section at the rear portion 29.

In the shown example, the middle portion 30 comprises a recess 32 in the width direction W (FIG. 5). The recess 32 has a curved shape with a radius R of curvature in the direction towards the shaft axis A (FIG. 4).

In order to stiffen the connection of the bearing housings 16, 17 to the bed frame 9, the right stiffening element 26 is connected by means of bolts 33 to the right foot 21 of the front bearing housing 16 and to the bed frame 9. The bolts 33 are inserted into the trough holes 31 of the front portion 28 and into through holes (not shown) of the right foot 21 of the front bearing housing 16. Then, the bolts 33 are fastened to the bed plate 9. Likewise, the right stiffening element 26 is connected by means of bolts 34 to the right foot 23 of the rear bearing housing 17 and to the bed frame 9.

The left stiffening element 27 is bolted in a similar manner as the right stiffening element 26 to the bearing housings 16, 17 and to the bed frame 9 by means of bolts 35, 36 (FIG. 2).

The stiffening elements 26, 27 provide a reinforcement of the bearing arrangement 8 such that a deformation of the bearing housings 16, 17 and of the bed frame 9 due to bending moments is significantly reduced. Further, non-torque loads from the rotor blades 6 can be better transmitted to the bed frame 9 and, thus, do not enter the gear box 12.

Figure 6:
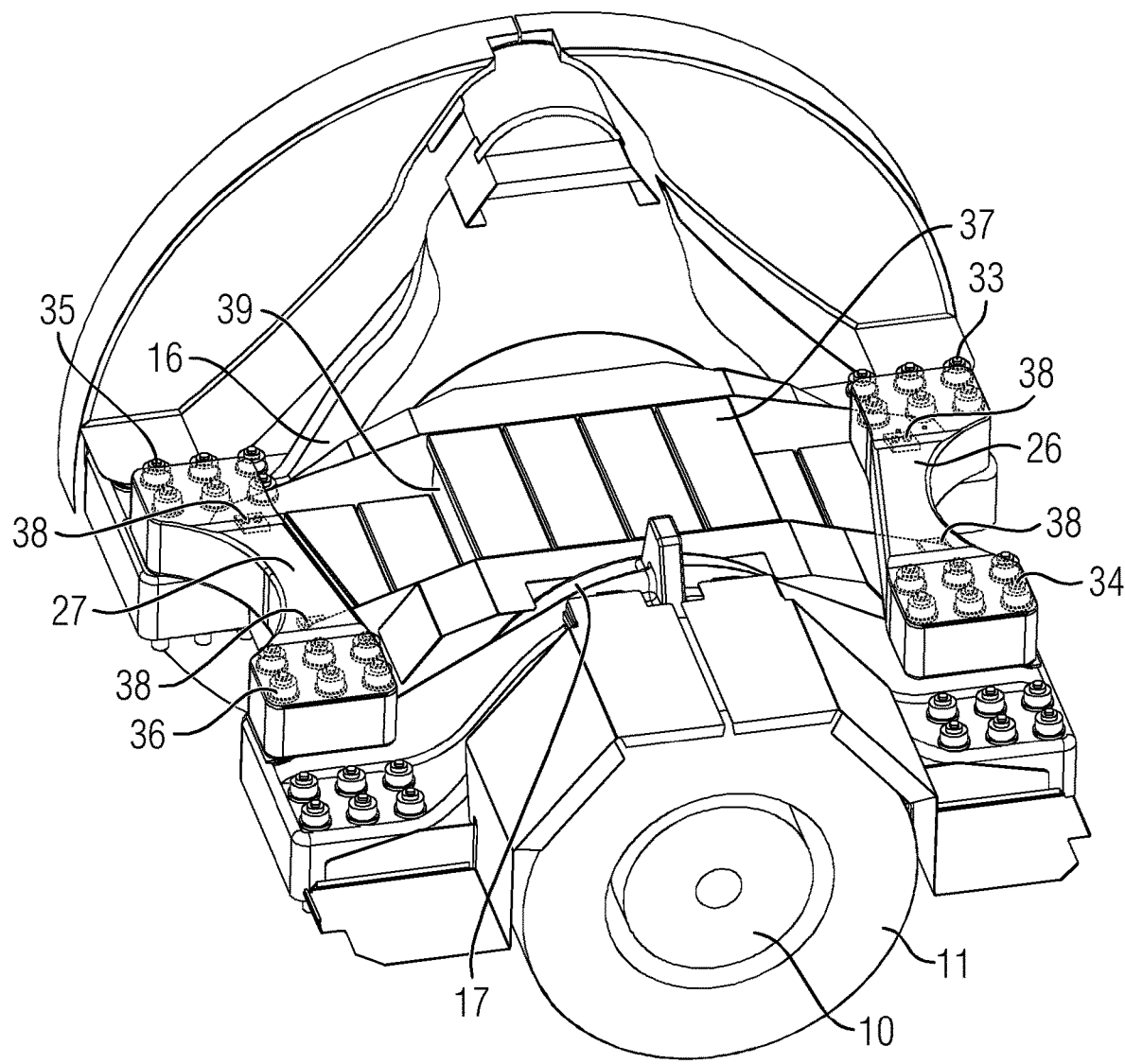
FIG. 6 shows a perspective view of the bearing arrangement of FIG. 2 along with a cover structure.

The bearing arrangement 8 further comprises a cover structure 37, as shown in FIG. 6. The cover structure 37 covers the main shaft 10 to protect the shaft 10 and/or to protect workers from the shaft 10 rotating during operation.

The cover structure 37 covers the shaft 10 without being in contact with the shaft 10 such that the shaft 10 can freely rotate. The cover structure 37 is connected to the front bearing housing 16 (e.g., by means of bolts, not shown), to the rear bearing housing 17 (e.g., by means of bolts, not shown), and to the stiffening elements 26, 27 (e.g., by means of bolts 38). The cover structure 37 comprises, for example, a perforated plate. The cover structure 37 may further comprises one or more steps 39. Thus, a worker can walk on the cover structure 37 and, for example, cross the shaft 10 even during operation of the wind turbine.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A bearing arrangement for a wind turbine, comprising:
 a bed frame,
 a shaft configured for connecting a rotor with a generator of the wind turbine,
 a front bearing and a rear bearing both supporting the shaft rotatably around a shaft axis,
 a front bearing housing supporting the front bearing, the front bearing housing having one or more feet directly connected to the bed frame,
 a rear bearing housing supporting the rear bearing, the rear bearing housing having one or more feet directly connected to the bed frame, and
 a stiffening element connecting one of the feet of the front bearing housing and one of the feet of the rear bearing housing, wherein the stiffening element extends along an extension direction from a front portion of the stiffening element to a rear portion of the stiffening element, the stiffening element being connected at its front portion to the one foot of the front bearing housing and being connected at its rear portion to the one foot of the rear bearing housing,
 wherein the stiffening element includes a middle portion between the front portion and the rear portion along the extension direction, and wherein a cross-section of the middle portion continuously varies along the extension direction such that an area of the cross-section is smaller than an area of a cross-section at the front portion of the stiffening element and an area of a cross-section at the rear portion of the stiffening element.

2. The bearing arrangement according to claim 1, wherein the stiffening element extends, exclusively, in one plane, the plane of the stiffening element being a horizontal plane or a plane inclined to the horizontal plane by an angle by which the shaft axis is inclined to the horizontal plane or a plane between the horizontal plane and the inclined plane.

3. The bearing arrangement according to claim 1, wherein a width of the cross-section of the stiffening element at the middle portion is smaller than a width of the cross-section at the front portion and a width of the cross-section at the rear portion.

4. The bearing arrangement according to claim 1, wherein a height of the cross-section of the stiffening element at the middle portion is equal to or larger than a height of the cross-section at the front portion and a height of the cross-section at the rear portion.

5. The bearing arrangement according to claim 1, wherein the stiffening element is arranged, exclusively, laterally with respect to the shaft axis when seen from above.

6. The bearing arrangement according to claim 1, comprising at least one of a first fastener fastening the stiffening element to the one foot of the front bearing housing and to the bed frame and a second fastener fastening the stiffening element to the one foot of the rear bearing housing and the bed frame.

7. The bearing arrangement according to claim 6, wherein the at least one of the first fastener and the second fastener comprise bolts.

8. The bearing arrangement according to claim 1, comprising a cover structure covering the shaft while being spaced apart from the shaft, the cover structure being connected to at least one of the front bearing housing, the rear bearing housing and the stiffening element.

9. The bearing arrangement according to claim 1, wherein at least one of the front bearing and the rear bearing is a spherical roller bearing.

10. The bearing arrangement according to claim 1, wherein the stiffening element is made from cast iron.

11. A wind turbine comprising a nacelle having the bearing arrangement of claim 1.

12. The wind turbine according to claim 11, wherein the shaft of the bearing arrangement connects the rotor with the generator.

* * * * *